Feb. 20, 1968 O. L. WOOD 3,369,557

FLUID LOGIC EXCLUSIVE OR DEVICE

Filed Oct. 23, 1964

INVENTOR.
ORIN L. WOOD
BY
H P Terry
ATTORNEY

United States Patent Office 3,369,557 Patented Feb. 20, 1968

3,369,557
FLUID LOGIC EXCLUSIVE OR DEVICE

Orin L. Wood, Salt Lake City, Utah, assignor to Sperry Rand Corporation, Great Neck, N.Y., a corporation of Delaware Filed Oct. 23, 1964, Ser. No. 405,981
1 Claim. (Cl. 137—81.5)

The present invention relates to fluid logic devices and particularly to fluid logic devices of the type suitable for use in fluid digital computer systems.

The present invention is directed to a pure fluid exclusive OR device utilizing two monostable fluid amplifiers. The fluid logic apparatus of the present invention may also be used as an exclusive OR NOT generator by adding an additional monostable fluid amplifier.

The fluid logic apparatus of the present invention is superior to the prior art devices which provide the same function in that electronic elements of this type suffer from the disadvantages of being relatively delicate, sensitive to environmental conditions and expensive while the prior art mechanical devices have moving parts with resulting high inertia characteristics and are susceptible to malfunctions primarily caused by sticking.

It is therefore a primary object of the present invention to provide fluid logic apparatus for controlling fluid flow without utilizing moving parts which is relatively inexpensive, simple to construct and reliable in operation.

It is a further object of the present invention to provide fluid logic apparatus which produces logic functions including the exclusive OR function.

The above objects are achieved by fluid logic apparatus utilizing first and second monostable fluid amplifiers having common control signal inputs and a common output channel which are interconnected so as to provide an exclusive OR function. By connecting the common output channel of the first and second monostable fluid amplifiers to the control signal channel of a third monostable fluid amplifier, the exclusive OR NOT function may also be generated.

These and other objects of the present invention will become apparent by referring to the drawings in which.

Figures 1, 2, 3:
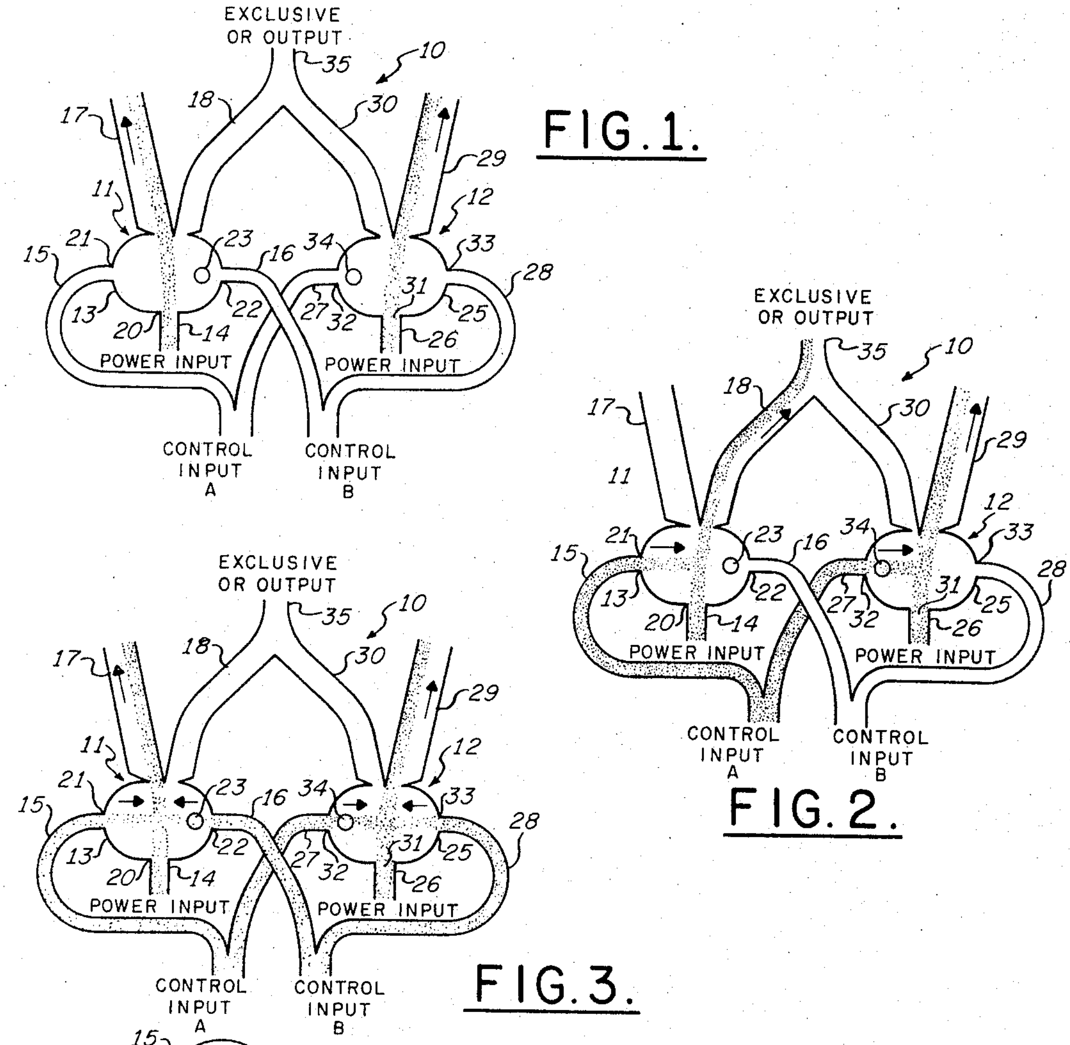
FIG. 1 is a schematic diagram of a fluid logic exclusive OR device when no control signal is present.
FIG. 2 is a schematic diagram similar to FIG. 1 with one control signal present resulting in an exclusive OR function being generated.
FIG. 3 is a schematic diagram similar to FIG. 1 with control signals present at both inputs thereby providing no output through the exclusive OR output channel.

Referring to FIG. 1, the pure fluid logic device 10 of the present invention includes first and second pure fluid monostable amplifiers 11 and 12. The monostable amplifiers 11 and 12 may be of the type disclosed for example, in U.S. patent application S.N. 352,468 entitled, "Multi-Mode Fluid Device," filed on Mar. 17, 1964, in the names of Fox and Goldschmied, and assigned to the same assignee as the present invention.

The monostable amplifier 11 includes an interaction chamber 13 which has in communication therewith a power stream input channel 14, first and second control stream input channels 15 and 16, respectively, and first and second output channels 17 and 18 respectively. The power stream input channel 14 terminates in an orifice 20 in the wall of the chamber 13. The control stream channels 15 and 16 terminate in respective orifices 21 and 22 in opposite walls of the chamber 13 in order that the control streams emanating therefrom are cooperative with an impact upon the power stream emanating from the orifice 20, in a manner to be more fully explained. The fluid amplifier 11 is arranged to have a monostable characteristic in order that the power stream emanating from the orifice 20 will normally flow through the first or leftward output channel 17 by means of a vent 23, for example, disposed in the rightward portion of the interaction chamber 13.

In a similar manner, the monostable fluid amplifier 12 includes an interaction chamber 25 which has in communication therewith a power stream input channel 26, first and second control stream input channels 27 and 28, respectively, and first and second output channels 29 and 30 respectively. The power stream input channel 26 terminates in an orifice 31 in the wall of the chamber 25. The control stream channels 27 and 28 terminate in respective orifices 32 and 33 in opposite walls of the chamber 25 in order that the control streams emanating therefrom are cooperative with and impact upon the power stream emanating from the orifice 31, in a manner to be more fully explained. The fluid amplifier 12 is arranged to have a monostable characteristic in order that the power stream emanating from the orifice 31 will normally flow through the first or rightward output channel 29 by means of a vent 34, for example, disposed in the leftward portion of the interaction chamber 25.

A control stream input signal source A as indicated by the legend is connected to the control stream channels 15 and 27. In a similar manner a control stream input signal source B also indicated by the legend is connected to the control stream channels 16 and 28. The control stream flows emanating from the control stream channels 15 and 16 are arranged to oppose each other while the control stream flows from the control stream channels 27 and 28 are similarly arranged to oppose each other. The output channels 18 and 30 are connected to a common exclusive OR output channel 35 to provide an exclusive OR function, in a manner to be more fully explained. Preferably, the control stream channels 15 and 28 are longer than the control stream channels 16 and 27 to insure proper sequencing of control signals.

In operation, if control signals of sufficient magnitude are provided at the control stream channels 15 and 28, the power stream outputs will switch to output channels 18 and 30, respectively, and will remain there until the control signals are removed. If control signals are present at control stream channels 16 and 27 and also at control stream channels 15 and 28, the monostable amplifiers 11 and 12 will not switch since the control signals produce equal and opposite control streams in the interaction chambers 13 and 25, respectively, and the power stream outputs remain flowing through the preferred output channels 17 and 29, respectively.

In detail, the operation is as follows. As shown in FIG. 1, in the absence of a control signal from sources A and B, there is no output in the exclusive OR output channel 35.

As shown in FIG. 2, if a control signal is present from input A and a control signal is absent from input B there is an output through the exclusive OR output channel 35 because the control signal A is applied through the control stream channel 15 which deflects the power stream from the output channel 17 to cause it to flow through the output channel 18 thereby providing an exclusive OR function. The control signal flow through the control stream channel 27 does not switch the output of the monostable amplifier 12 since the power stream continues to flow through the preferred output signal 29.

Similarly, it will be appreciated that if there was a control signal from the input B and none from the input A the power stream emanating from the orifice 31 of monostable amplifier 12 would be deflected from the output channel 29 to the output channel 30 thereby providing an exclusive OR function while the power stream flowing from the orifice 20 in the monostable amplifier 11 would continue to flow through the preferred output channel 17.

Referring now to FIG. 3, with control signals appearing at both inputs A and B there is no output through the exclusive OR channel 35 because the control streams emanating from the opposing orifices in the respective amplifiers 11 and 12 oppose and cancel each other and the power stream flows continue to flow through the preferred output channels 17 and 29, respectively.

It is desirable to have the portions of the control signal which provide control streams through the channels 16 and 27 arrive in the respective interaction chambers 13 and 25 prior to portions of the control signals emanating from the control channels 15 and 28 in order to prevent a spurious momentary output through the exclusive OR output channel 35. For this reason the channel 15 and 28 are longer than the channels 16 and 27. Due to the monostable characteristics of the amplifiers 11 and 12, whenever the power streams have been deflected to flow through the exclusive OR output channel 35, they automatically return and flow through the preferred output channels 17 and 29, respectively, upon termination of the control stream flow.

Figure 4:
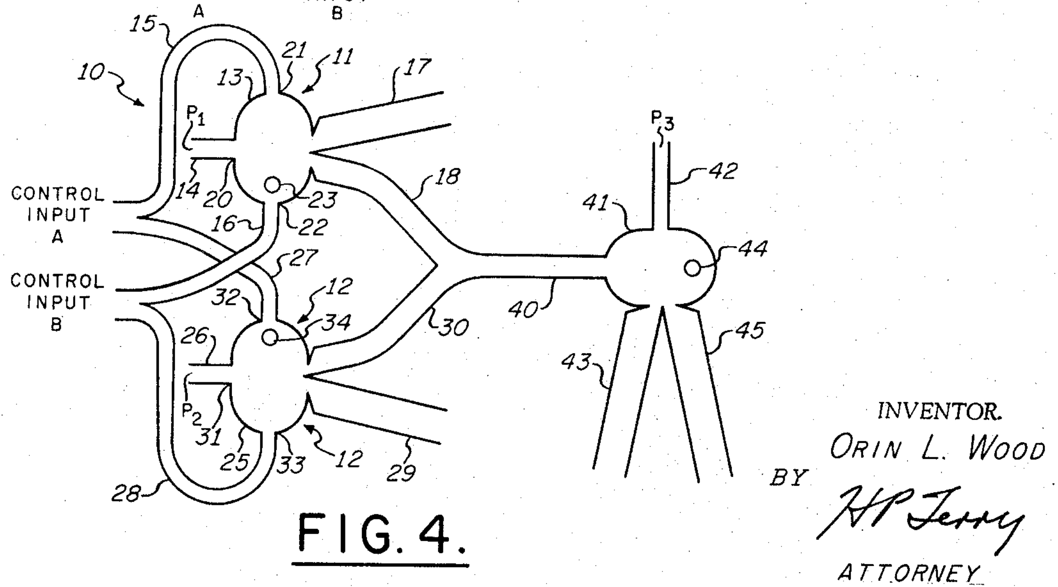
FIG. 4 is a schematic diagram similar to that shown with respect to FIG. 1 and further including an additional monostable fluid amplifier connected to the exclusive OR output channel to provide an exclusive OR NOT generator.

Referring now to FIG. 4, an exclusive OR-exclusive OR NOT generator may be provided by connecting the control stream channel 40 of a third monostable amplifier 41 to be responsive to flow from the exclusive OR output channel 35 of the monostable amplifiers 11 and 12. In the absence of a control signal through the control channel 40, the power stream from the power input channel 42 of the amplifier 41 would flow through the preferred output channel 43 because of the vent 44 which defines the monostable characteristics of the amplifier 41.

In the presence of a control signal through the control channel 40, the control stream from the control channel 40 deflects the power stream causing it to switch from the preferred output channel 43 to the exclusive OR output channel 45 of the amplifier 41.

While the invention has been described in its preferred embodiments, it is to be understood that the words which have been used are words of description rather than limitation and that changes within the purview of the appended claim may be made without departing from the true scope and spirit of the invention in its broader aspects.

What is claimed is:

1. A pure fluid logic device comprising, (a) first and second monostable pure fluid logic amplifiers each having a power stream input channel for defining a power stream, first and second control stream channels for defining first and second opposing control streams for impacting with said power stream, first and second output channels each defining a path of fluid flow, an interaction chamber communicating with said channels, and means for providing each of said amplifiers with its monostable characteristic whereby said power stream normally tends to flow through said first output channels in the absence of a control stream, (b) the length of said control stream channels which provide control streams tending to maintain said power streams flowing through said first output channels being shorter than the length of said control stream channels which provide control streams tending to switch said power streams whereby inadvertent switching is prevented, (c) a first control signal source connected to said first input channels of each of said first and second amplifiers, (d) a second control signal source connected to said second control signal channels of each of said first and second amplifiers, and (e) said second output channels being connected to a common exclusive OR output channel whereby in the presence of a control signal being provided exclusively from control signal source A or B, an output signal is provided from said exclusive OR output channel.

References Cited

UNITED STATES PATENTS

| | | | |
|---|---|---|---|
| 3,080,886 | 3/1963 | Severson | 137—81.5 X |
| 3,117,593 | 1/1964 | Sower | 137—81.5 X |
| 3,199,782 | 8/1965 | Shinn | 137—81.5 X |
| 3,229,705 | 1/1966 | Norwood | 137—81.5 |
| 3,238,961 | 3/1966 | Hatch | 137—81.5 |
| 3,258,023 | 6/1966 | Bowles | 137—81.5 |

M. CARY NELSON, *Primary Examiner.*

S. SCOTT, *Examiner.*